US007480109B1

(12) United States Patent
Hu et al.

(10) Patent No.: US 7,480,109 B1
(45) Date of Patent: Jan. 20, 2009

(54) PIEZOELECTRICALLY DRIVEN OPTICAL LENS MODULE

(75) Inventors: Chao-Chang Hu, Tainan (TW);
Han-Wei Su, Tainan (TW);
Ching-Chang Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/153,400

(22) Filed: May 19, 2008

(30) Foreign Application Priority Data

Dec. 31, 2007 (TW) .............................. 96151551 A
Jan. 10, 2008 (TW) .............................. 97100954 A

(51) Int. Cl.
*G02B 7/02* (2006.01)
*G03B 17/00* (2006.01)
*G03B 3/10* (2006.01)

(52) U.S. Cl. ...................... 359/824; 359/823; 359/694; 396/75; 396/133; 310/317; 310/323.02; 310/328; 310/323.17; 348/357

(58) Field of Classification Search ................ 359/814, 359/823, 824, 694, 696; 396/75, 85, 133; 310/316, 317, 323.01, 323.02, 323.17, 328; 348/208, 335, 357
See application file for complete search history.

(56) References Cited

U.S. PATENT DOCUMENTS

| 5,225,941 | A | | 7/1993 | Saito et al. |
| 5,644,440 | A | * | 7/1997 | Akada .......................... 359/823 |
| 5,812,330 | A | * | 9/1998 | Akada .......................... 359/823 |
| 6,067,421 | A | * | 5/2000 | Kitazawa et al. ............. 396/133 |
| 6,232,698 | B1 | * | 5/2001 | Kaida et al. .................. 310/320 |
| 6,710,950 | B2 | | 3/2004 | Rouvinen et al. |
| 6,961,193 | B2 | | 11/2005 | Kang et al. |
| 7,084,550 | B2 | * | 8/2006 | Sasaki et al. ............. 310/323.17 |
| 7,099,093 | B2 | | 8/2006 | Jeong et al. |
| 7,199,506 | B2 | * | 4/2007 | Sasaki et al. ................. 310/328 |
| 7,365,914 | B2 | * | 4/2008 | Sasaki et al. ................. 359/696 |
| 7,372,190 | B2 | * | 5/2008 | Manabe ........................ 310/328 |
| 7,403,342 | B2 | * | 7/2008 | Sasaki ........................ 359/694 |
| 7,432,636 | B2 | * | 10/2008 | Ito et al. ....................... 310/328 |
| 7,433,138 | B2 | * | 10/2008 | Sasaki ........................ 359/824 |

FOREIGN PATENT DOCUMENTS

TW          589777          6/2004

* cited by examiner

*Primary Examiner*—Loha Ben
(74) *Attorney, Agent, or Firm*—Rabin & Berdo, P.C.

(57) ABSTRACT

The present invention provides a piezoelectrically driven optical lens module. The piezoelectrically driven optical lens module includes at least a lens body, a guiding rod for providing an axial movement track, a piezoelectric element for providing driving force, and an elastic element for providing the piezoelectric element with pre-load, so as to allow the piezoelectric element to be in contact with the guiding rod. The lens body includes at least an enclosed hollow structure, a lens barrel axially moveable and fixed to the enclosed hollow structure, and a lens element fixed to the lens barrel. The piezoelectric element is in contact with the guiding rod via the elastic elements, and the piezoelectric element is used for driving the lens barrel to move linearly along the guiding rod. The present invention provides a piezoelectrically driven optical lens module with a simple structure, to overcome the drawbacks of the prior art.

24 Claims, 9 Drawing Sheets

PIEZOELECTRICALLY DRIVEN OPTICAL LENS MODULE

BACKGROUND OF THE INVENTION

1. Field of the Invention

This invention generally relates to optical lens modules, and more specifically, to a piezoelectrically driven optical lens module.

2. Description of Related Art

In order to cope with the trends toward small-sized cellular phones and cameras, optical systems and their actuators applied to cellular phones and cameras nowadays tend to have a simple structure and a small size. A piezoelectric actuator, which has advantageous features of small size, high output force, low power consumption, noiselessness, and high compatibility, has been widely applied to digital cameras and camera phones, for driving an optical lens module to zoom in or out, and has also become one of the important techniques applied to optical systems or related merchandises.

Taiwanese Patent No. 589,777 discloses a multi-layered, thin-disk, piezoelectrically driven ultrasonic motor, which is characterized by applying high AC voltages to piezoelectric buzzers, to produce deformation of alternate expansion and contraction. Consequently, an elastic vibration element is driven to produce traveling and stationary waves to provide external kinetics, and form a driving module in a vertical or horizontal mode. Although the wear and tear of the components is reduced, the patent requires using multiple driving modules in combinations. Thus, the motor structure is complicated, and miniaturization is impossible.

Referring to FIG. 1, U.S. Pat. No. 7,099,093 discloses a compact lens module comprising a plurality of driving units 100 for driving a contact wheel 101 to move a plurality of shafts 102, and further enabling a plurality of lenses 103 to move forward or backward. By applying the torque principle (M=r×F), downsizing a plurality of contact wheels 101 reduces the overall volume of the compact lens module. However, it requires the driving units 100 to output more force, thereby consuming more power and decreasing overall driving efficiency; on the other hand, enlarging the contact wheel 101 increases the overall volume of the compact lens module to the detriment of miniaturization.

Referring to FIG. 2, U.S. Pat. No. 5,225,941 discloses a driving device characterized by a laminated piezoelectric element 104, a plurality of leaf springs 105, and a plurality of lenses 106. The piezoelectric element 104 functions as a power source and leaf springs 105 generate pre-load. When a signal is inputted, the leaf springs 105 cause a plurality of lenses 106 to move forward or backward. However, the piezoelectric element 104 has to be implemented in the form of a multi-layered piezoelectric disk to perform sufficient displacement and generate sufficient output force, and therefore, it is difficult to thin out the laminated piezoelectric element 104.

U.S. Pat. No. 6,710,950 discloses a piezoelectric actuator applied to an optical system of digital cameras. As shown in FIG. 3, a piezoelectric actuator 109 is coupled to a lens barrel 108 housing a lens element 107. The piezoelectric actuator 109 comprises a circuit board 110, a plurality of piezoelectric elements 111, and a plurality of engagement pads 112. The circuit board 110 and each the piezoelectric elements 111 are disposed on the inner surface of the circuit board 110 at an interval, and the engagement pads 112 are coupled to the surface of each of the piezoelectric elements 111. Then, a voltage is applied to the piezoelectric elements 111 circumferentially disposed on the periphery of the lens element 107 to generate surface waves, thereby enabling each of the engagement pads 112 to simultaneously poke the lens element 107 to displace axially relative to the lens barrel 108, and further achieving the objects of zooming or focusing of the optical lens of a digital camera. However, a plurality of piezoelectric elements is used in the patent, thereby incurring high costs and causing difficulty in assembly. Moreover, it is very difficult to control precision of displacements, while driving each of the piezoelectric elements to simultaneously poke the lens element. Furthermore, the length of the lens barrel 108 depends on displacements, and thus the length of the lens barrel 108 increases as the distance of a displacement increases. This is detrimental to miniaturization.

U.S. Pat. No. 6,961,193 discloses a driving device for driving a lens. As shown in FIG. 4, the driving device comprises a driving means 113 for generating inertia to drive a lens 114 to move forward or backward. However, a weight 115 is externally applied to produce inertia. This does not only increase the overall external diameter of the driving device and difficulty in assembly, but also increases the overall weight of the driving device.

In view of above-mentioned drawbacks of the prior arts, it is important to provide a piezoelectrically driven optical lens module with advantageous features, such as large torque, a small size, simplified constituent elements, rigid framework, ease of fabrication and assembly.

SUMMARY OF THE INVENTION

In light of the shortcomings of the above prior arts, it is an object of the present invention to provide a piezoelectrically driven optical lens module with simplified constituent elements.

It is another object of the present invention to provide a piezoelectrically driven optical lens module with a reduced size.

It is a further object of the present invention to provide a piezoelectrically driven optical lens module with enhanced torque.

It is still another object of the present invention to provide a piezoelectrically driven optical lens module with a rigid framework.

It is still another object of the present invention to provide a piezoelectrically driven optical lens module that can be fabricated easily.

It is still another object of the present invention to provide a piezoelectrically driven optical lens module that can be assembled easily.

To achieve the above-mentioned and other objects, the present invention provides a piezoelectrically driven zoom lens module, comprising: a lens body having at least an enclosed hollow structure with a light aperture formed therein by external communication, a lens barrel positioned in the enclosed hollow structure and axially moveable along the axis of the light aperture, and a lens element fixed to the inside of the lens barrel corresponding to the axis of the light aperture; a guiding rod fixed to the inside of the enclosed hollow structure and adjacent to an outer side of the lens barrel, wherein the guiding rod has a frictional surface parallel to the axis of the light aperture; a piezoelectric element fixed to the outer side of the lens barrel and in contact with the frictional surface, so as to drive the lens barrel to move linearly along the guiding rod; and an elastic element disposed by straddling across the guiding rod and fixed to the outer side of the lens barrel, so as to provide the piezoelectric element with pre-load for being in contact with the frictional surface.

In the above-mentioned piezoelectrically driven optical lens, the lens body may further comprise a cover, and the enclosed hollow structure may have an opening corresponding to the cover to set the lens barrel, the lens element, the piezoelectric element, the guiding rod, and the elastic element within. Then, the positions of these constituent elements can be secured in position by sealing the cover. In one embodiment, the lens body comprises a plurality of lens barrels and lens elements in the same number. In another embodiment, the lens body comprises a single lens barrel and a lens element, and preferably, the lens barrel has a first screwing portion, for example, internal threads, and the lens element has a second screwing portion, for example, external threads. The second screwing portion is screwed into the first screwing portion. The above-mentioned lens element may be one of an optical lens or a group of lenses.

In addition, the lens body may further comprises an auxiliary rod disposed in the enclosed hollow structure and parallel to the axis of the lens barrel, and the lens barrel has a plurality of corresponding guiding slots disposed on its outer side, thereby providing the lens barrel with auxiliary guidance to move axially along over the axis of the light aperture in the enclosed hollow structure, and further enhancing stability of linear movements of the lens barrel.

The lens barrel has a plurality of engagement grooves disposed on its outer side to firmly hold the piezoelectric element, and preferably, the engagement grooves are C-shaped grooves. The piezoelectric element may consist of a metal tube and two piezoelectric ceramic elements, and preferably, the two piezoelectric ceramic elements are disposed an interval to the outer surface of the metal tube. The piezoelectric ceramic elements may be multi-layered or single-layered, and depending on their shapes, the piezoelectric ceramic elements may be treated with processes of polarization, electrode coating, or cutting based on its modeling shape.

The guiding rod is a cylinder, and preferably, the cylinder consists of a flat surface and a round curved surface, and the frictional surface is disposed on the flat surface of the guiding rod. In one embodiment, the frictional surface is a wear resistant layer, and preferably, the material of the wear resistant layer is selected from one of metal, oxide, and any wear resistant material. The elastic element is, for example, an U-shaped leaf spring, which is capable of clasping two opposite sides of the lens barrel. At the same time, the elastic element may further have a positioning groove for laying the elastic element correspondingly across the guiding rod.

Furthermore, the piezoelectrically driven optical lens module provided by the present invention may further comprise a position detection device disposed in the enclosed hollow structure, and the position detection device is used for detecting the axial position of the lens barrel relative to the enclosed hollow structure. The position detection device may be one of an optical detection device or an electromagnetic detection device. In a preferred embodiment, the position detection device may comprise a position response element fixed to the outer side of the lens barrel, and a signal reception element fixed to the enclosed hollow structure to receive signals. In another preferred embodiment, the position detection device may comprise a position response element fixed to the enclosed hollow structure, and a signal reception element fixed to the outer side of the lens barrel to receive signals. Preferably, the position response element may be a reflective bar code, and the signal receiving element may be a sensor.

Compared with the prior art, the present invention uses a piezoelectric driving device capable of acquiring excellent image quality by zooming of the lens element, to achieve large torque and a small size. The piezoelectric driving device is applicable to camera phones. In addition, none of the major constituent elements of the present invention, such as the lens body, the piezoelectric element, the guiding rod, the elastic element and the position detection device, has a complicated design, and thus the object of simplifying constituent elements and providing a rigid construction and easiness of fabrication are also achieved. Furthermore, the major constituent elements of the present invention can be obtained as standard products or one-piece products, therefore the major constituent elements can be easily fabricated. Additionally, each of the constituent elements of the present invention has its own position or engagement site; therefore the constituent elements can be readily assembled. In conclusion, the present invention has overcome drawbacks of prior arts, and therefore, has high industrial applicability.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification.

First Embodiment

Figure 1:
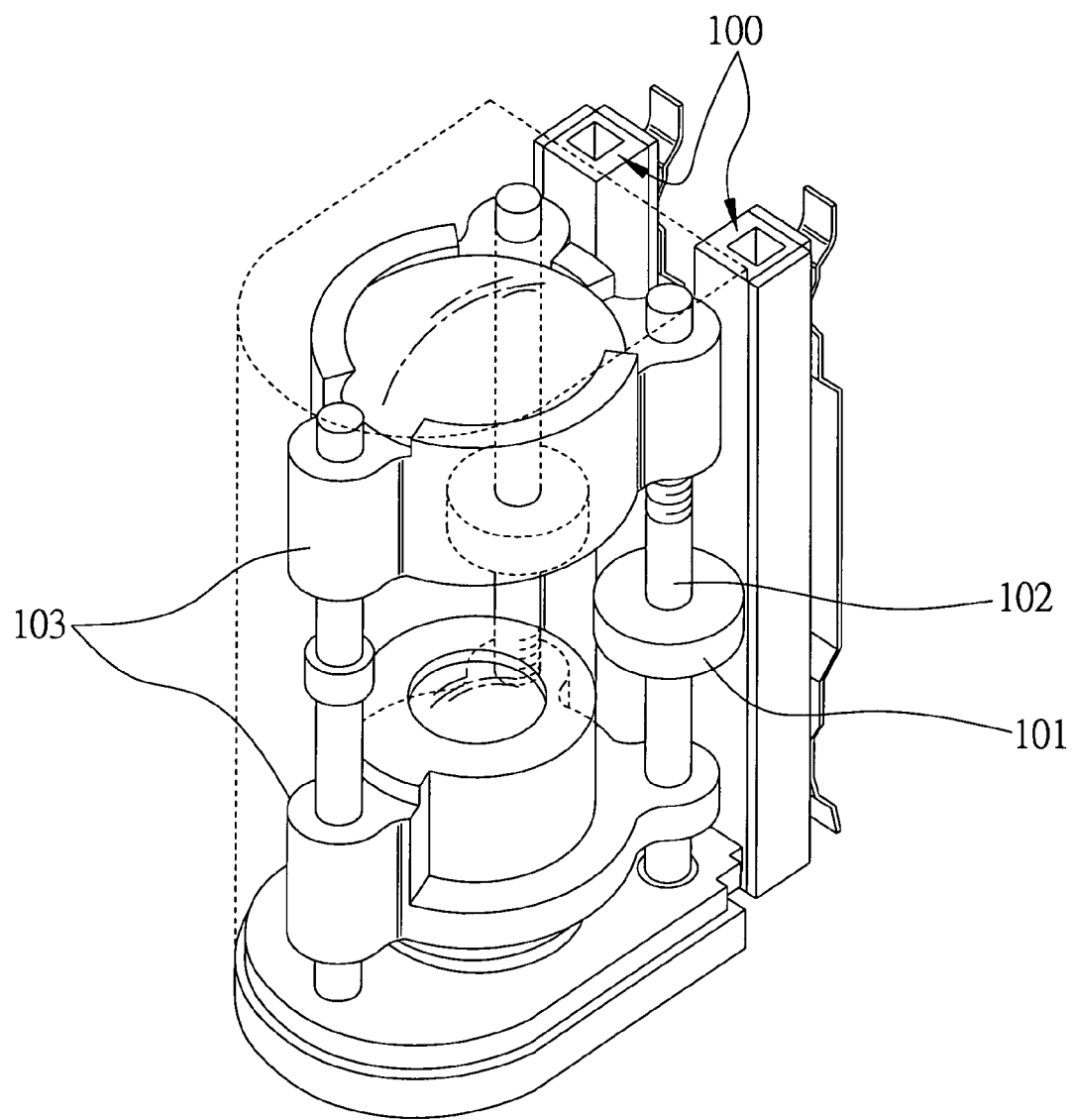
FIG. 1 is a schematic diagram illustrating the compact lens module of U.S. Pat. No. 7,099,093.
Figure 2:
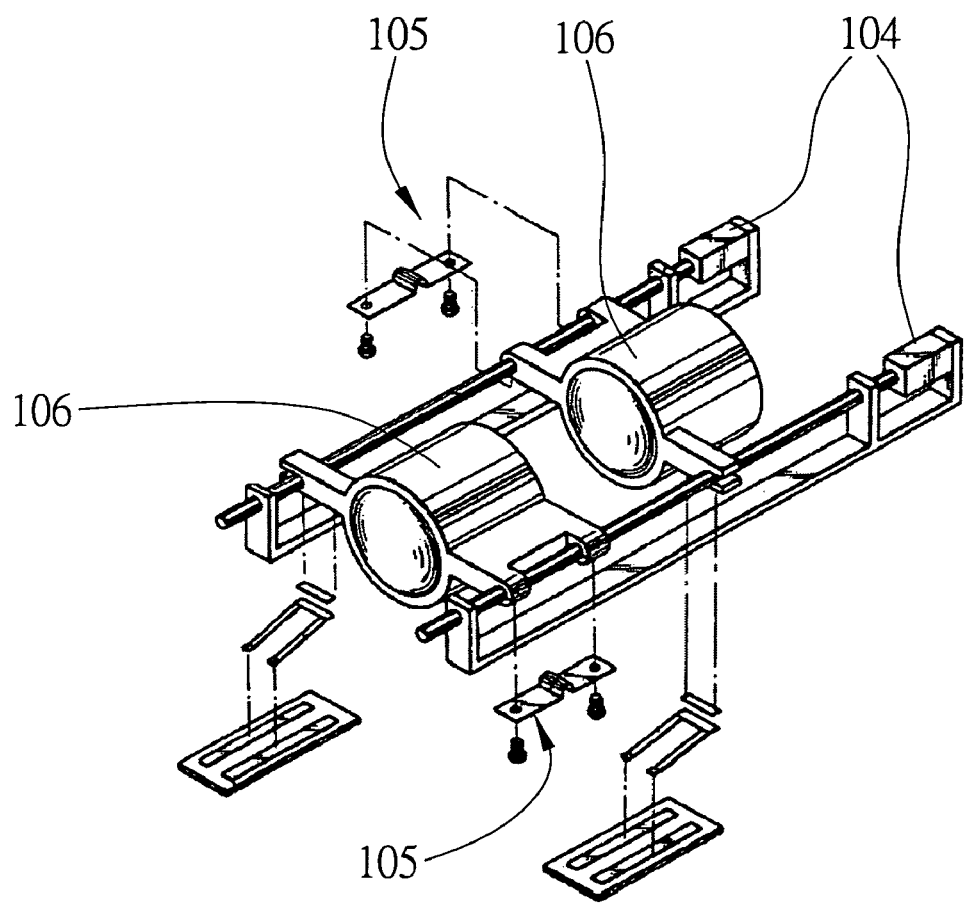
FIG. 2 is a schematic diagram illustrating the piezoelectric element of U.S. Pat. No. 5,225,941.
Figure 3:
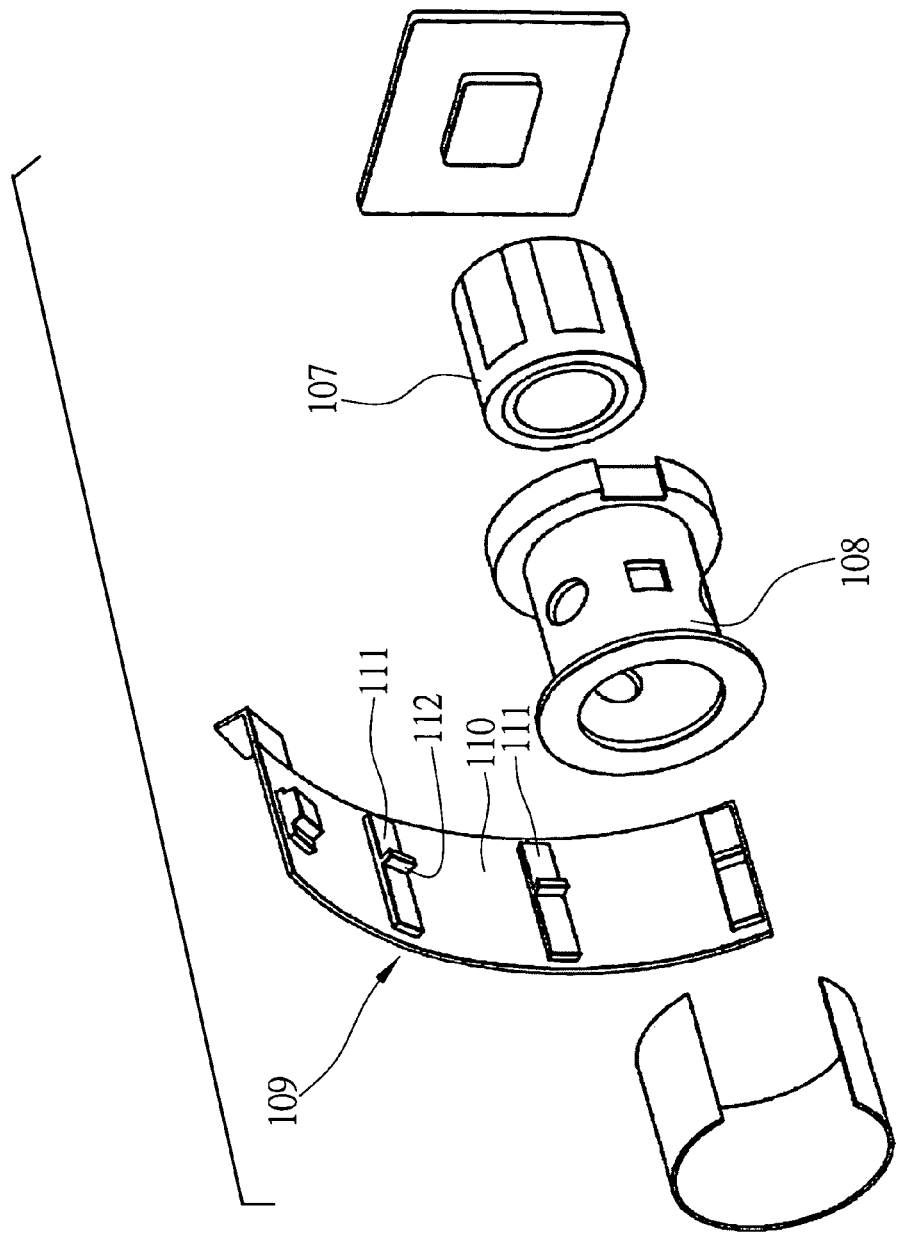
FIG. 3 is a schematic diagram illustrating the piezoelectric actuator of U.S. Pat. No. 6,710,950.
Figure 4:
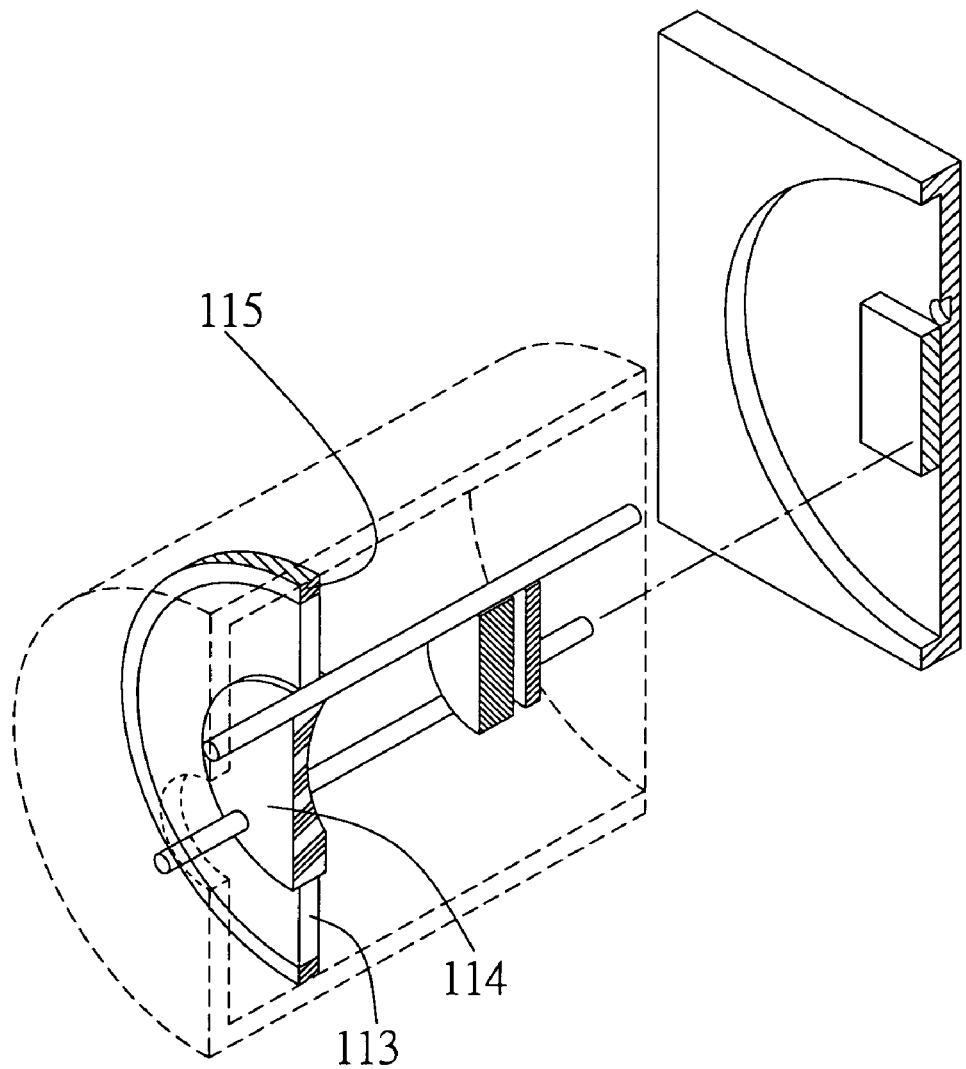
FIG. 4 is a schematic diagram illustrating the driving device of U.S. Pat. No. 6,961,193.
Figure 5:
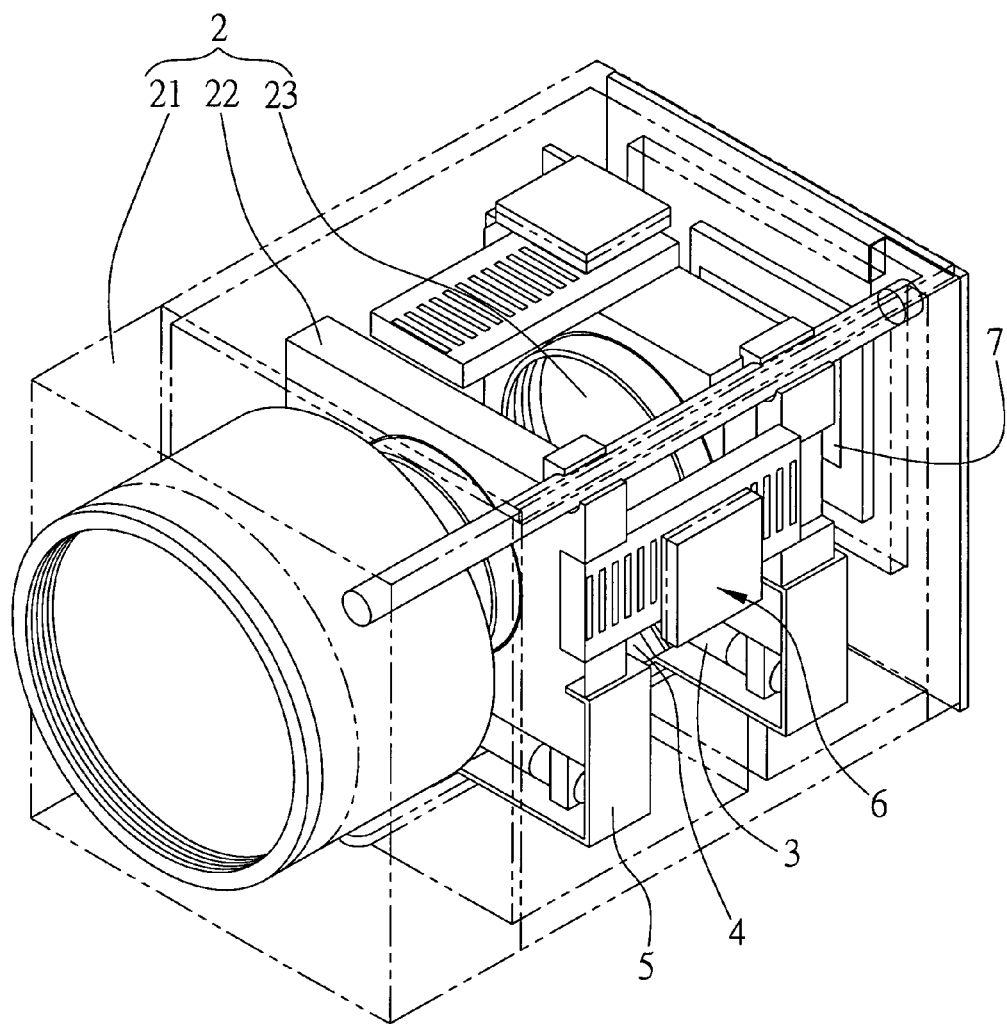
FIG. 5 is a schematic diagram illustrating the piezoelectrically driven optical lens module according to the first embodiment of the present invention.
Figure 6A:
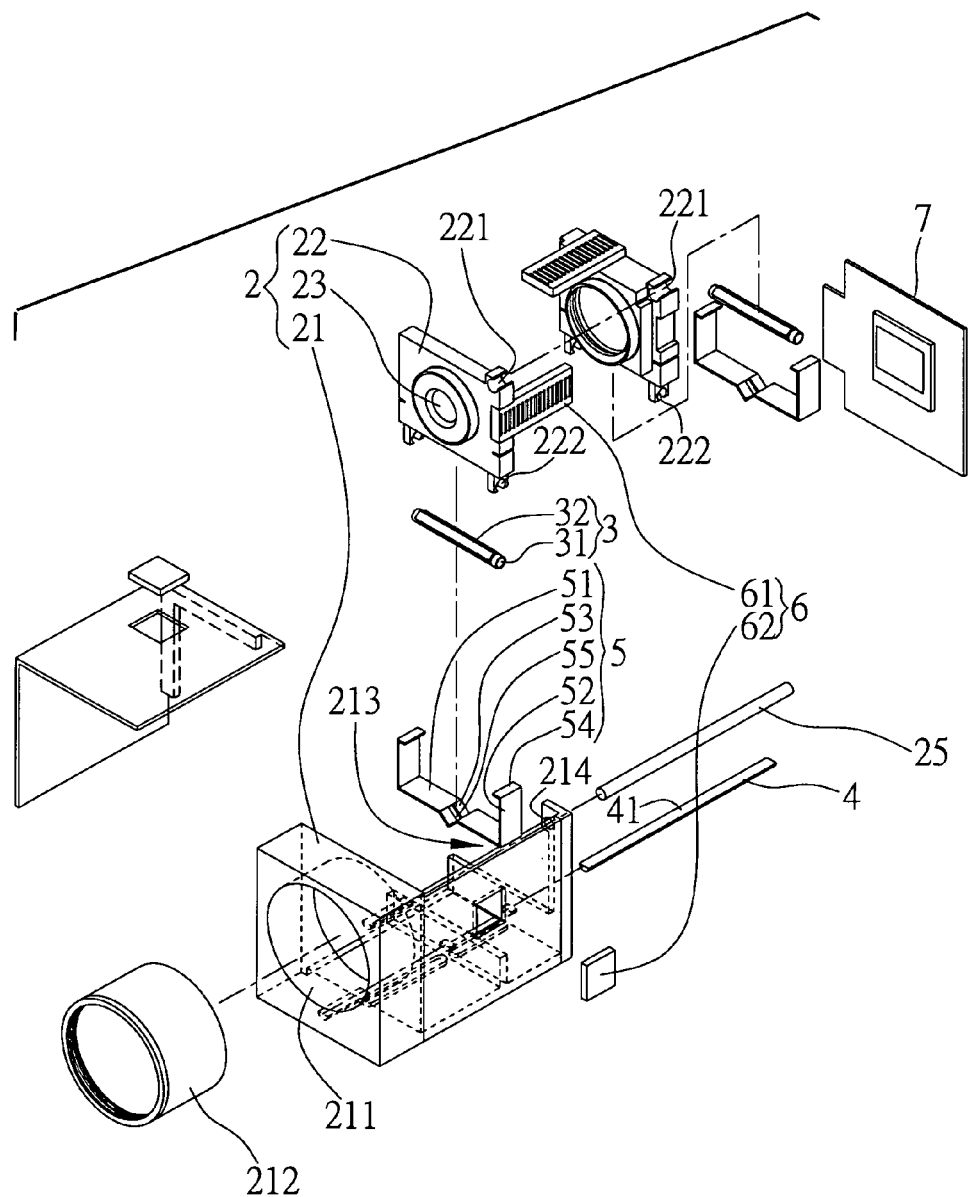
FIGS. 6A and 6B are an exploded view and a partial schematic diagram, respectively, of the piezoelectrically driven optical lens module according to the first embodiment of the present invention.
Figure 6B:
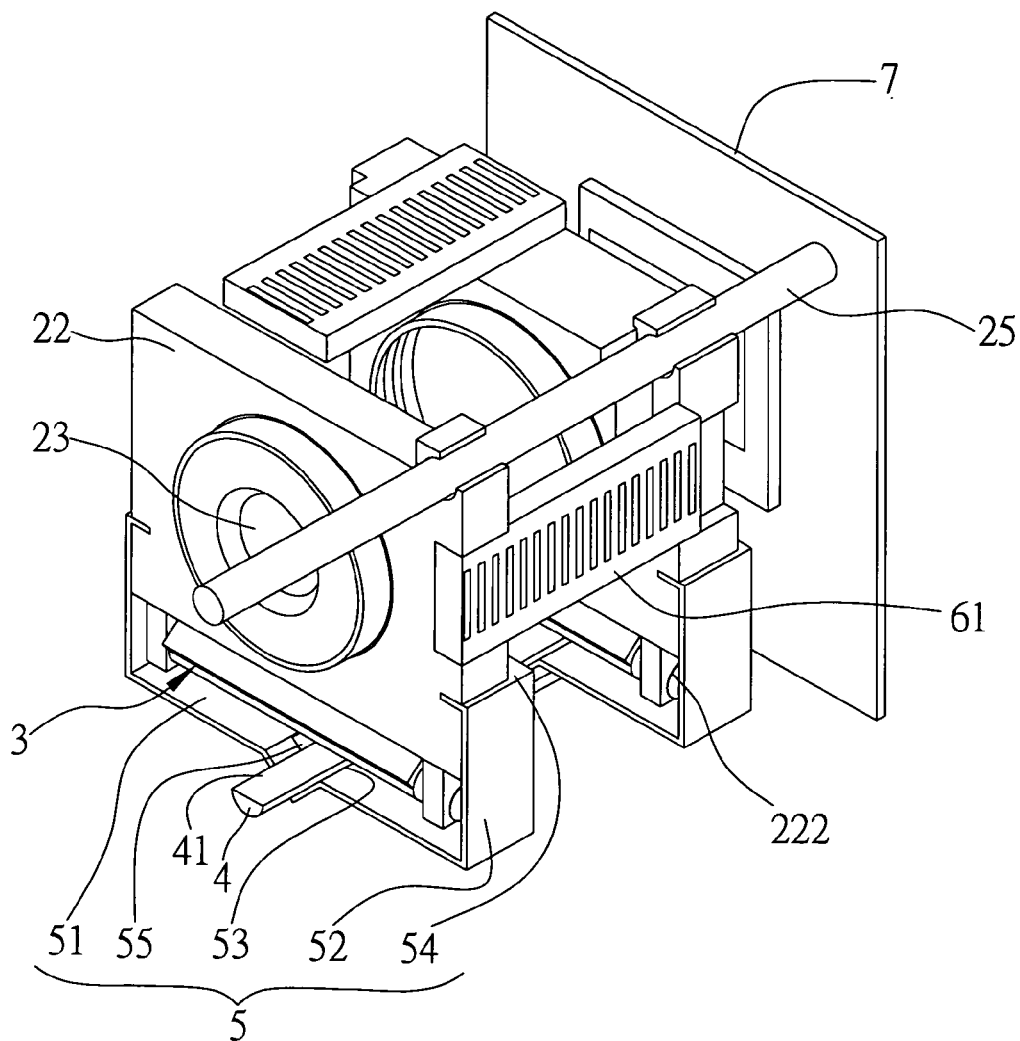

Referring to FIGS. 5, 6A and 6B, the present invention provides a piezoelectrically driven optical lens module, comprising: a lens body 2, at least a piezoelectric element 3 for providing driving force, at least a rod 4 in contact with the piezoelectric element 3 to provide an axial movement track, and at least an elastic element 5 for providing the piezoelectric element 3 with pre-load to contact the guiding rod 4. The above-mentioned constituent elements are sufficient to constitute a modularized piezoelectrically driven optical lens module. Due to various degrees of modularization, the piezoelectrically driven optical lens module may further integrate a position detection device 6 for detecting changes in position or an image sensor 7 for capturing images. The variations depend on specifications of actual product assemblies. Both of the position detection device 6 and image sensor 7 are illustrated herein with the appended drawings to enhance comprehension of the present invention, and the illustrations should not be construed as limiting the scope of the technical features essential for implementing the present invention.

The lens body 2 comprises at least an enclosed hollow structure 21 having a light aperture 211 formed therein by external communication, a lens barrel 22 positioned in the enclosed hollow structure 21 and axially moveable along the axis of the light aperture 211, and a lens element 23 fixed to the inside of the lens barrel 22 and corresponding to the axis of the light aperture 211. The piezoelectric element 3 is fixed to an outer side of the lens barrel 22 to provide a driving force. The guiding rod 4 is fixed to the enclosed hollow structure 21, and is adjacent to an outer side of the lens barrel 22. The guiding rod 4 has a frictional surface 41 parallel to the axis of the light aperture 211 and in contact with the piezoelectric element 3. The elastic element 5 is disposed on the external surface of the lens barrel 22 to provide the piezoelectric element 3 with pre-load for being in contact with the guiding rod 4. The position detection device 6 is disposed in the enclosed hollow structure 21 to detect the axial position of the lens barrel 22 relative to the enclosed hollow structure 21. The constituent elements of the piezoelectrically driven optical lens modules are relatively simple, thereby overcoming a drawback of the prior art.

Although the lens body 2 according to present embodiment uses two lens barrels 22 and corresponding lens elements 23 fixed in the enclosed hollow structure 21 to perform zooming as an example, two sets of piezoelectric elements 3, guiding rods 4, elastic elements 5, and position detection devices 6 are also used. However, in other embodiments, the quantity of the above-mentioned elements may vary according to the actual design of the optical system, namely, the number of the lens elements of the optical system. Therefore, the lens body 2 may comprise a single lens barrel 22 or a plurality of lens barrels 22 and the same number of lens elements 23. The above-mentioned lens element 23 may be one of a single optical lens or a plurality of lenses, depending on the design of the optical system. Moreover, combinations of the constituent elements are based on the design of an optical system, rather than the technical features of the optical zoom lens of the present invention. Therefore, no detailed descriptions will be given herein. Despite that there is a variety of lens bodies with a zoom function, the present invention is applicable to any lens body comprising an enclosed hollow structure 21, at least a lens barrel 22 positioned in the enclosed hollow body 21 and axially moveable along the axis of the light aperture 211, and at least a lens element 23 fixed to the inside of the lens barrel 22 and corresponding to the axis of the light aperture 211. To enable persons having ordinary skills in the art to carry out the present invention, two examples of framework design of lens body 2 are presented. The two examples should not be construed as limiting the scope of the lens body of the present invention.

Referring to FIGS. 5, 6A and 6B, the lens body 2, the piezoelectric element 3 for providing driving force, the guiding rod 4 in contact with the piezoelectric element 3 and allowing the lens barrel 22 to move axially, the elastic element 5 for providing the piezoelectric element 3 with pre-load to be in contact with the guiding rod 4, and the position detection device 6 for detecting changes in position are further described.

The lens body 2 comprises at least the enclosed hollow structure 21 having a light aperture 211 formed therein by external communication, a lens barrel 22 positioned in the enclosed hollow structure 21 and axially moveable along the axis of the light aperture 211, and the lens element 23 fixed to the inside of the lens barrel 22 and corresponding to the axis of the light aperture 211. In the present embodiment, two lens barrels 22 and two lens elements 23 corresponding and fixed to the two lens barrels 22 are disposed in the enclosed hollow structure 21 of the lens body 2. Quantitative variations depend on the actual design of an optical system, and implementations of the present invention are not affected. Therefore, the following descriptions are focused on a pair of lens barrels 22 and lens elements 23.

The light aperture 211 is provided at the front end of the enclosed hollow structure 21, and an optical lens (or a group of lenses) 212 are assembled to close the light aperture 211. The enclosed hollow structure 21 is disposed with the lens barrel 22 axially moveable along the axis of the light aperture 211, and the lens element 23 fixed to the inside of the lens barrel 22 and corresponding to the axis of the light aperture 211. Moreover, the lens body 2 may further comprise a cover (not shown). The enclosed hollow structure 21 may comprise an opening 213 corresponding to the cover, so as to set the lens barrel 22, the lens element 23, the piezoelectric element 3, the guiding rod 4, and the elastic element 5 and to be secure the position of the cover by sealing. Furthermore, the lens body 2 further comprises an auxiliary guiding rod 25 disposed in the enclosed hollow structure 21 and parallel to the axis of the light aperture 211. A plurality of guiding slots 221 corresponding to the auxiliary guiding rod 25 are disposed on the outer side of the lens barrel 22, so as to provide the lens barrel 22 with auxiliary guidance for moving axially along the axis of the light aperture 211. For exemplification, the auxiliary guiding rod 25 and the guiding slots 221 are disposed in at corners of the enclosed hollow structure 21. Furthermore, the enclosed hollow structure 21 is disposed with a plurality of insertion holes 214 for securing the auxiliary guiding rod 25 in position.

The piezoelectric element 3 is fixed to the outer side of the lens barrel 22, and drives the lens barrel 22 to move axially relative to the enclosed hollow structure 21, so as to zoom (or focus). In the present embodiment, the piezoelectric element 3 is disposed on the lower end of the lens barrel 22. A plurality of engagement grooves 222 are disposed on the outer side of the lens barrel 22 to secure the piezoelectric element 3 in position, thereby providing the piezoelectric element 3 with an optimal fixation boundary. The engagement grooves 222 are C-shaped grooves.

The piezoelectric element 3 comprises a metal tube 31 and two piezoelectric ceramic elements 32, wherein the metal tube 31 may be one of an aluminum tube and a copper tube (e.g., a brass tube), and the two piezoelectric ceramic elements 32 are disposed on the outer surface of the metal tube 31 at an interval, for instance, being spaced apart by a 90-degree side angle. The piezoelectric ceramic elements 32 are either single-layered or multi-layered. At the same time, depending on the states and shapes of the piezoelectric ceramic elements 32, the piezoelectric ceramic elements 32 may be treated with a process of polarization, electrode coating, or cutting.

The metal tube 31 may be connected to the cathode of an applied electric field, and each of the two piezoelectric ceramic elements 32 may be connected to the anode of an applied electric fields. By applying voltages (for instance, a sinusoidal voltage $V \sin \omega t$ or $V \cos \omega t$) to one of the piezoelectric ceramic elements 32, a reverse piezoelectric effect enables the piezoelectric element 3 to generate bias high-frequency mechanical energy. Eventually, the piezoelectric element 3 undergoes a circular motion similar to the motion of a moving hula hoop. On the other hand, the power control of a bidirectional rotation (clockwise and counterclockwise)

can be controlled to drive the lens barrel 22 to move axially forward or backward relative to the enclosed hollow structure 21. Of course, it is also feasible to apply a square wave or a serrasoid driving voltage to the piezoelectric ceramic element 32. It has been verified in the present embodiment that a driving voltage of >23V is capable of driving the lens barrel 22 and the lens element 23 to move forward or backward.

Although the piezoelectric element 3 of the present embodiment consists of a metal tube 31 and two piezoelectric ceramic elements 32 as an example, any element that provides a circular motion similar to a hula-hoop pattern can be regarded as the piezoelectric element 3 of the present invention. For instance, a commonly found piezoelectric tube comprising a tubular piezoelectric ceramic body of, for example, PZT (lead zirconate titanate) and an electrostrictive material, and first, second, and third electrodes alternately disposed on the external surface of the tubular piezoelectric ceramic body, can be implemented. The first electrode is connected to the cathode of an applied electric field, while the second and third electrodes are each connected to the anode of an applied electric field.

Moreover, each of the guiding rods 4 of the present embodiment is disposed in the enclosed hollow structure 21, and is adjacent to the outer side of the lens barrel 22. Each of the guiding rods 4 has a frictional surface 41 parallel to the axis of the light aperture 211, and remains in contact with the piezoelectric element 3. In the present embodiment, the guiding rod 4 is, for example, a cylinder with a flat surface and a round curved surface, wherein the frictional surface 41 is disposed on the flat surface of the cylinder. A wear resistant layer is used as an example of the above-mentioned frictional surface 41, and the wear resistant layer is preferably made from one of metal, oxide, or wear resistant materials. It is noteworthy that besides providing the frictional surface 41 when the piezoelectric element 3 remains in contact with the guiding rod 4, the piezoelectric element 3 and the guiding rod 4 may further coordinate with the above-mentioned auxiliary guiding rod 25 to provide the lens element 23 with linear movement track. Compared with prior arts, the present invention indeed achieves objects of simplifying constituent elements, miniaturization, and reducing production costs.

The elastic element 5 of the present embodiment is disposed by straddling across the guiding rod 25, and is fixed to the outer side of the lens barrel 22, so as to provide the piezoelectric elements 3 with pre-load to be in contact with the frictional surface 41 of the guiding rod 4. In the present embodiment, the elastic element 5 is a leaf spring with a U-shaped cross-section are used as an example. In the example, the elastic element 5 has a bottom portion 51 and two side arms 52 extending and bent upwardly from the bottom portion 51. The elastic element 5 extends from the lower end of the lens barrel 22, and clasp upwardly to two opposite sides of the lens barrel 22, wherein the bottom portions 51 of the elastic element 5 covers the piezoelectric element 3 and the guiding rod 4, thereby supporting and limiting the guiding rods 4 and the piezoelectric elements 3 to dispose on the elastic elements 5 to allow the frictional surface 41 of the guiding rod 4 to be in contact with the piezoelectric element 3.

Preferably, the elastic element 5 further comprises a positioning groove 53, for example, a V-shaped, an U-shaped, or an arc-shaped groove, disposed on the middle of the bottom portion 51, and the positioning groove 53 straddles across a guiding rod 4. The design of the positioning groove 53 is based on the design of the round curved surface of the guiding rods 4, so as to effectively secure the guiding rods 4 in position and ensure that the frictional surface 41 of the guiding rods 4 remains in contact with the piezoelectric element 3. The guiding rods 4 are prevented from going off track relative to the elastic element 5, when the lens element 22 moves axially along the guiding rods 4 driven by the piezoelectric element 3. In additional, the positioning groove 53 can further reduce the friction between the guiding rod 4 and the elastic element 5, while the guiding rods 4 and the elastic elements 5 remain in contact with each other. Similarly, with the same consideration, the elastic element 5 is preferably made of a material with a relatively lower coefficient of friction with respect to the guiding rod 4.

Moreover, the two side arms 52 of the elastic element 5 face slightly inward, for instance, with a 5-degree declination angle, thereby enabling the elastic elements 5 to clasp to the lens elements 22 more securely. Likewise, with the same consideration, a plurality of top wings 54 extending inwardly can be further devised at a free end relative to the bottom portion 51, and the free end is positioned at the two side arms 52 of the elastic elements 5. The top wings 54 are used for engaging to the lens elements 22. Furthermore, in order to increase flexibility or reduce weight, a flexible structure 55 can further be preset on the bottom section 51 of the elastic element 5. The flexible structure 55 is, for example, a slit formed on surface of the bottom section 51 according to the present embodiment.

Using the above-mentioned enclosed hollow structure 21 disposed with two lens barrels and corresponding lens elements 23 as an example, each of the piezoelectric element 3, the guiding rod 4, and the elastic element 5 is disposed on the lower end of the lens barrels 22, wherein the guiding rod 4 can further coordinate with the disposed auxiliary guiding rod 25 to secure the lens element 22 in position and enable displacement thereof, besides remaining in contact with the piezoelectric elements 3 to provide the lens barrel 22 with a frictional surface 41. Compared with prior arts, the present invention indeed achieves the objects of simplifying constituent elements, minimizing space for disposal, and facilitating reduction in the overall volume of the piezoelectrically driven optical lens module of the present invention.

The position detection device 6 is one of an optical detection device and an electromagnetic detection device. In the present embodiment, the position detection device 6 comprises a position response element 61 fixed to the outer side of the lens barrel 22, and a signal reception element 62 fixed to the enclosed hollow structure 21 to receive signals. The position response element 61 is, for example, a reflective bar code, and the signal reception element 62 is, for example, a sensor element. The overall image quality of the optical lens depends heavily on precision of drive position of the two sets of lens elements 23, and therefore, use of the position detection device 6 can indeed provides real-time position signals that can ensure feedback and adjustment of driving control of the piezoelectric element 3. Consequently, the lens barrels 22 are ensured to be at a precise position, so that the image quality can be assured. Of course, the position detection device 6 may also be reversibly disposed. For instance, the position response element 61 is fixed to the enclosed hollow structure 21, while the signal reception element 62 is fixed to the outer side of the lens barrel 22. Since simple swapping of positions is conceivable by persons having ordinary skills in the art, no repetitive illustrations and descriptions are provided herein.

The image sensor 7 can be fixed to the enclosed hollow structure 21 of the lens body 2 to capture image signals. In the present embodiment, the image sensor 7 is one of a charge coupled device (CCD) and a complementary metal oxide semiconductor (CMOS).

Second Embodiment

Figure 7:
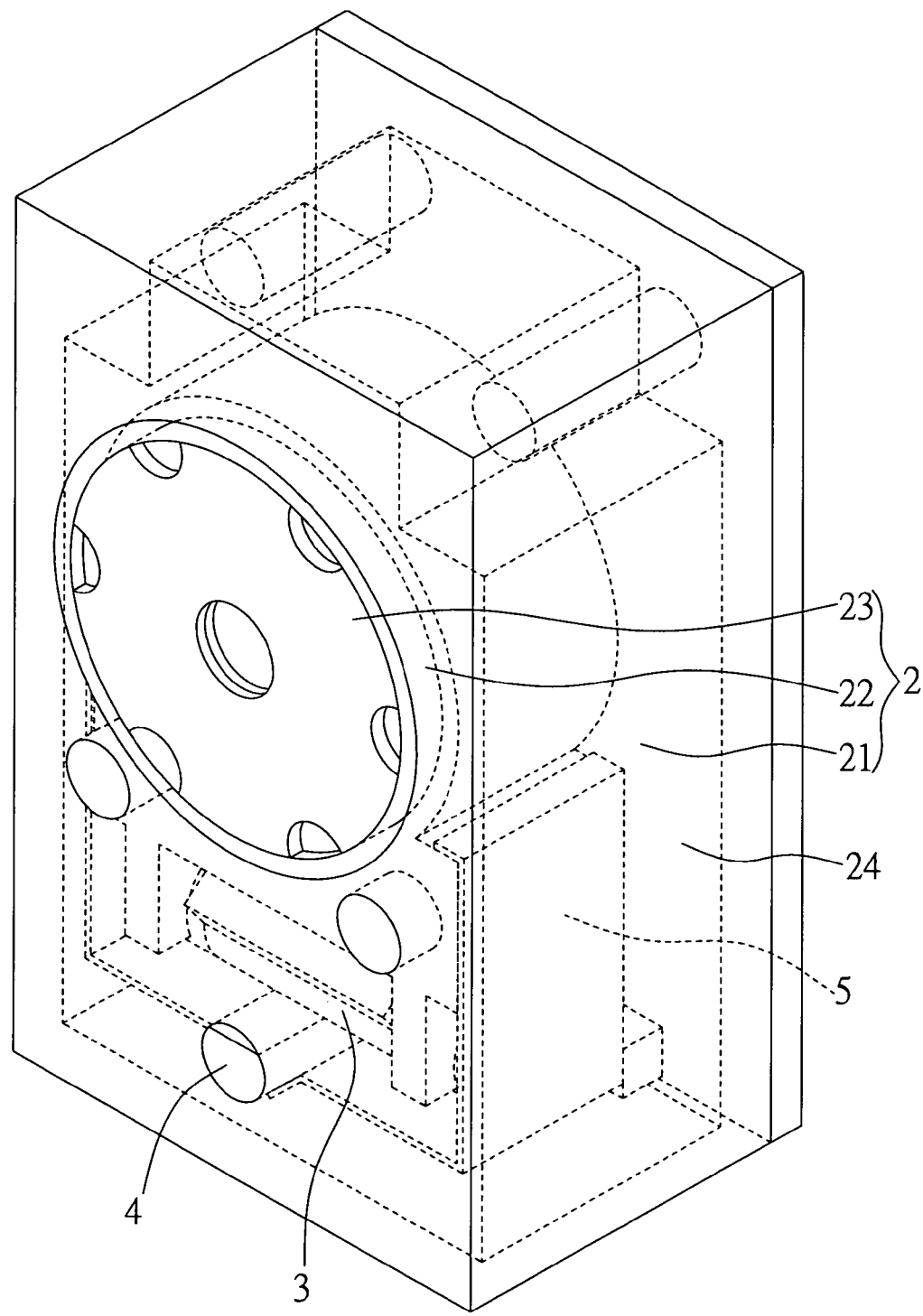
FIG. 7 is a schematic diagram illustrating the piezoelectrically driven optical lens module according to the second embodiment of the present invention.
Figure 8:
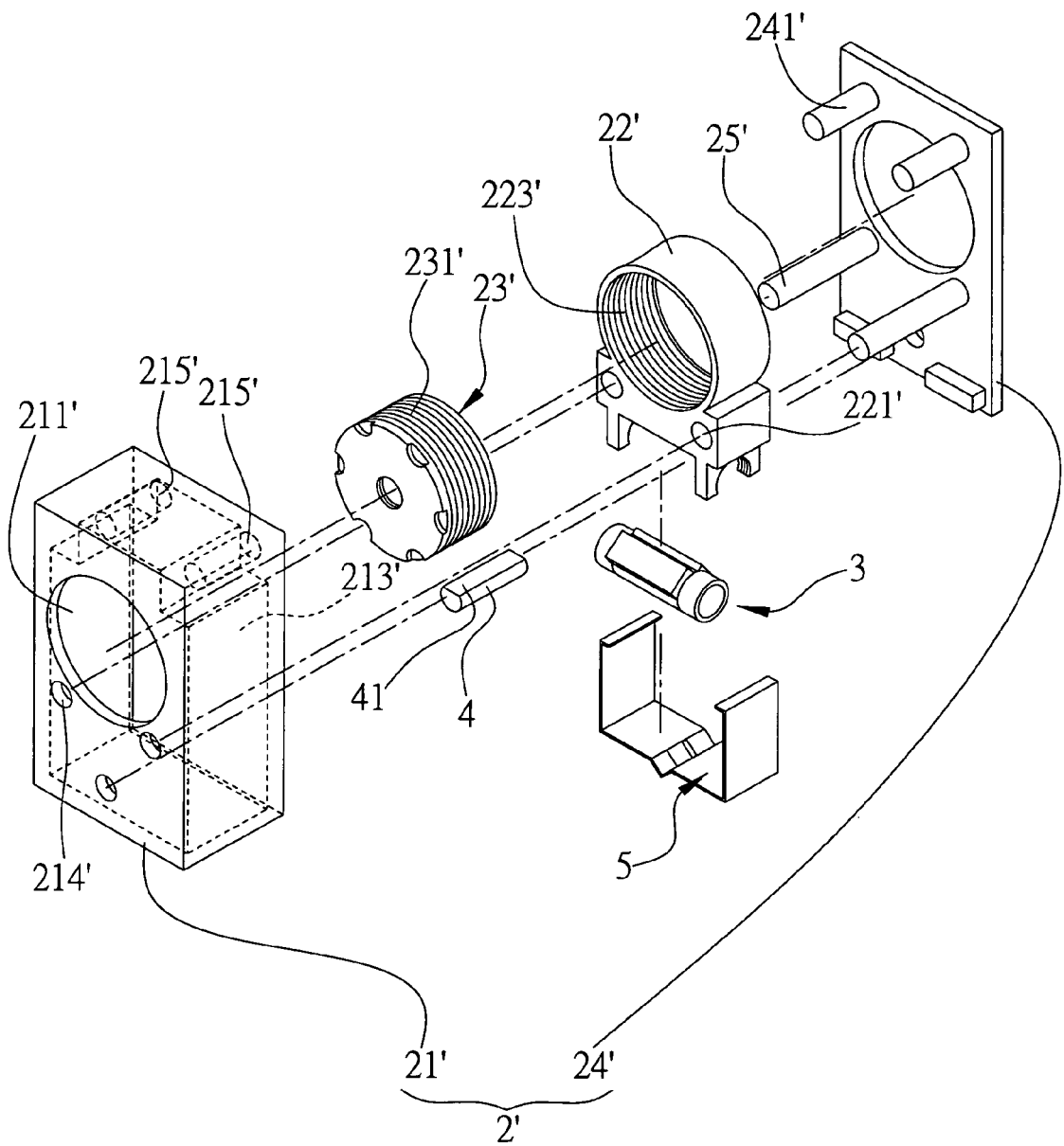
FIG. 8 is an exploded view of the piezoelectrically driven optical lens module according to the second embodiment of the present invention.

Referring to FIGS. 7 and 8, the present embodiment is different from the first embodiment in the position of disposal of an enclosed hollow structure 21', a plurality of lens barrels 22' and a plurality of lens elements 23' of a lens body 2'. The position detection device 6 is present in the first embodiment but absent from the second embodiment. Since the design of other related elements, such as the piezoelectric element 3, the guiding rod 4, and the elastic element 5, are mostly the same as those taught in the first embodiment, the same features and reference numerals will not be described repeatedly or redefined. The differences between the first and the present embodiments are described below.

As shown in FIGS. 7 and 8, the lens body 2' at least comprises an enclosed hollow structure 21' having a light aperture 211' formed therein by external communication, a lens barrel 22' fixed to the enclosed hollow structure 21' and axially moveable along the axis of the light aperture 211', and a lens element 23' fixed to the inside of the lens barrel 22' and corresponding to the light aperture 211'. In the present embodiment, a single lens barrel 22' and a corresponding lens element 23' are disposed in the enclosed hollow structure 21' of the lens body 2', wherein the lens barrel 22' further comprises a first screwing portion 223', for example, internal threads, and the lens element 23' has a second screwing portion 231', for example, external threads. The second screwing portion 231' is locked up by screwing into the first screwing portion 223'. The single lens barrel 22' and the corresponding lens element 23' are capable of moving axially along the axis of the light aperture 211' driven by coordination among the piezoelectric element 3, the guiding rod 4, and the elastic element 5, thereby enabling the lens barrel 22' and the lens element 23' to focus.

The lens body 2' further comprises a cover 24', for example, a support plate structure. Positioning portions 241' and 251' are disposed, respectively, in the corresponding sites on the cover 24' and the enclosed hollow structure 21', so as to allow the cover 24' and the enclosed hollow structure 21' to be integrated with each other. The enclosed hollow structure 21' has an opening 213' corresponding to the cover 24'. The opening 213' allows the lens barrel 22', the lens element 23', the piezoelectric element 3, the guiding rod 4, and the elastic element 5 to be installed, and the cover 24' is secured in position by sealing. Moreover, a pair of auxiliary guiding rods 25' are parallel to the axis of the light aperture 211', and the auxiliary guiding rods 25' are each provided on one of the two opposite sides of the cover 24'. A pair of guiding slots 221' corresponding to the auxiliary guiding rods 25' are provided on the outer side of the lens barrel 22'. Additionally, a pair of corresponding insertion holes 214' are disposed in the enclosed hollow structure 21' to allow the auxiliary guiding rods 25' to plug through.

In conclusion, the present invention uses the piezoelectric driving device to drive the optical lens module, and achieves the objects of providing an optical zoom and auto-focus device applicable to audio/video systems, monitoring systems, optical systems, cameras, digital cameras, and camera phones. The optical zoom and auto-focus device has a number of advantageous features, such as having a large torque, a small size, simplified constituent elements, a rigid framework, easiness of fabrication and assembly, thereby overcoming drawbacks of the prior art.

The present invention has been described using exemplary preferred embodiments. However, it is to be understood that the scope of the present invention is not limited to the disclosed arrangements. The scope of the claims, therefore, should be accorded the broadest interpretation, so as to encompass all such modifications and similar arrangements.

What is claimed is:

1. A piezoelectrically driven optical lens module, comprising:

a lens body comprising at least an enclosed hollow structure having a light aperture formed therein for external communication, a lens barrel positioned in the enclosed hollow structure and axially moveable along the axis of the light aperture, and a lens element fixed to the lens barrel and corresponding to the axis of the light aperture;

a guiding rod fixed to the enclosed hollow structure and adjacent to an outer side of the lens barrel, the guiding rod having a frictional surface parallel to the axis of the light aperture;

a piezoelectric element fixed to the outer side of the lens barrel and being in contact with the frictional surface of the guiding rod, so as to drive the lens barrel to move linearly along the guiding rod; and an elastic element disposed by straddling across the guiding rod and fixed to the outer side of the lens barrel, so as to provide the piezoelectric element with pre-load for being in contact with the frictional surface of the guiding rod.

2. The piezoelectrically driven optical lens module of claim 1, wherein the lens body comprises a plurality of lens barrels and the same number of lens elements, and a piezoelectric element and an elastic element are fixed to each of the lens barrels.

3. The piezoelectrically driven optical lens module of claim 2, wherein the lens element is one of an optical lens and a group of lenses.

4. The piezoelectrically driven optical lens module of claim 1, wherein the lens body comprises a single lens barrel and a lens element, wherein the lens barrel has a first screwing portion and the lens element has a second screwing portion correspondingly screwed into the first screwing portion.

5. The piezoelectrically driven optical lens module of claim 4, wherein the first screwing portion is internal threads, and the second screwing portion is external threads.

6. The piezoelectrically driven optical lens module of claim 1, wherein the lens body further comprises a cover, and the enclosed hollow structure has an opening corresponding to the cover, the opening is used for setting the lens barrel, the lens element, the piezoelectric element, the guiding rod, and the elastic element, and the cover is secured in position by sealing, wherein the cover is a support plate.

7. The piezoelectrically driven optical lens module of claim 1, wherein the lens body further comprises at least an auxiliary guiding rod disposed in the enclosed hollow structure and parallel to the axis of the light aperture, and a plurality of guiding slots corresponding to the auxiliary guiding rod is disposed on the outer side of the lens barrel, thereby guiding the lens barrel to move axially along the axis of the light aperture within the enclosed hollow structure.

8. The piezoelectrically driven optical lens module of claim 1, wherein the lens barrel is externally disposed with a plurality of engagement grooves for securing the piezoelectric element in position.

9. The piezoelectrically driven optical lens module of claim 8, wherein the engagement grooves are C-shaped grooves.

10. The piezoelectrically driven optical lens module of claim 1, wherein the piezoelectric element comprises a metal tube and two piezoelectric ceramic elements.

11. The piezoelectrically driven optical lens module of claim 10, wherein the two piezoelectric ceramic elements are disposed on the external surface of the metal tube at an interval.

12. The piezoelectrically driven optical lens module of claim 10, wherein each of the piezoelectric ceramic elements is one of a single-layered piezoelectric ceramic element and a multi-layered piezoelectric ceramic element.

13. The piezoelectrically driven optical lens module of claim 10, wherein treatment of the piezoelectric ceramic elements with a polarization process, an electrode coating process, or a cutting process depends on states and shapes of the piezoelectric ceramic elements.

14. The piezoelectrically driven optical lens module of claim 1, wherein the guiding rod is a cylinder with a flat surface and a round curved surface, and the frictional surface is disposed on the flat surface of the guiding rod, wherein the frictional surface is a wear resistant layer.

15. The piezoelectrically driven optical lens module of claim 14, wherein the wear resistant layer is made of one of metal, oxide, and any wear resistant material.

16. The piezoelectrically driven optical lens module of claim 1, wherein the elastic element is a leaf spring disposed by straddling across the guiding rod, and clasped to be fixed to two opposite sides of the lens barrel.

17. The piezoelectrically driven optical lens module of claim 16, wherein the leaf spring has a U-shaped cross-section.

18. The piezoelectrically driven optical lens module of claim 16, wherein the leaf spring has a positioning groove disposed by straddling across the guiding rod.

19. The piezoelectrically driven optical lens module of claim 18, wherein the positioning groove has one selected from the group consisting of a V-shaped cross-section, a square cross-section, and a curved cross-section.

20. The piezoelectrically driven optical lens module of claim 1, further comprising a position detection device disposed in the enclosed hollow structure for detecting the axial position of the lens barrel relative to the enclosed hollow structure.

21. The piezoelectrically driven optical lens module of claim 20, wherein the position detection device is one of an optical detection device and an electromagnetic detection device.

22. The piezoelectrically driven optical lens module of claim 20, wherein the position detection device further comprises a reflective bar code fixed to the outer side of the lens barrel and a sensor element fixed to the enclosed hollow structure for receiving signals.

23. The piezoelectrically driven optical lens module of claim 20, wherein the position detection device further comprises a reflective bar code fixed to the enclosed hollow structure and a sensor element fixed to the outer side of the lens barrel for receiving signals.

24. The piezoelectrically driven optical lens module of claim 1, wherein the lens body further comprises an image sensor for capturing image signals.

* * * * *